Sept. 10, 1940.  J. D. BOBBROFF  2,214,116
LAWN MOWER
Filed Oct. 24, 1938
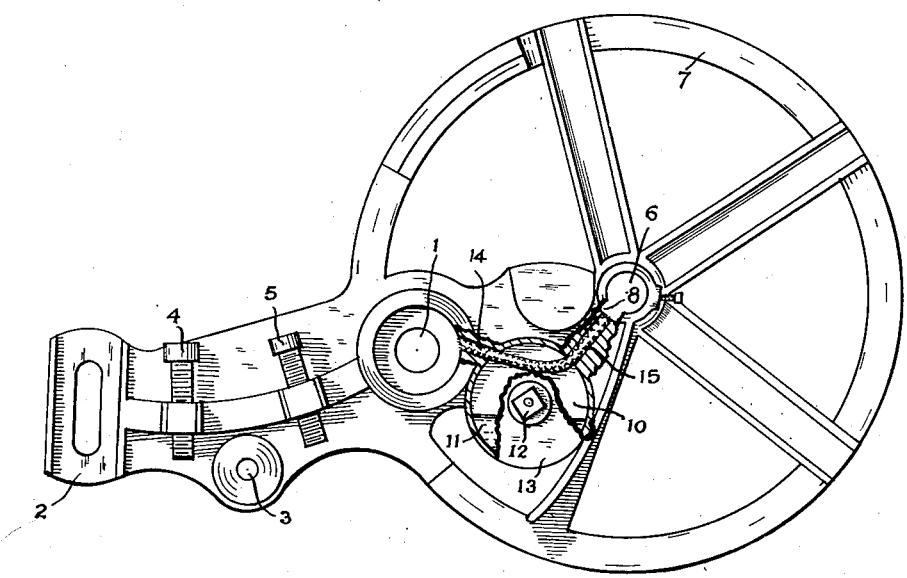
Inventor:
James D. Bobbroff,
By Rudolph B. Prentice,
Attorney.

UNITED STATES PATENT OFFICE 2,214,116

LAWN MOWER

James D. Bobbroff, Portland, Oreg., assignor to Eversharp Lawnmower Co., a corporation of Nevada Application October 24, 1938, Serial No. 236,652

4 Claims. (Cl. 308—132)

My invention relates to lawn mowers of the type wherein a rotary cutter-head is journaled in end members and more particularly to means for lubricating the cutter-head journals.

The principal object of my invention is the provision of satisfactory lubricating means.

A second object of my invention is the provision of means for storing and automatically regulating the supply of oil to the bearings when the mower is in operation only.

Other objects and advantages of my invention will be apparent in the following discourse wherein the significance of the reference characters in the accompanying drawing, details of construction of a typical member embodying my invention, and the particular advantages thereof are explained.

The figure in the drawing represents a view of the side of an end casting used in lawn mowers in which my invention has been embodied, partly in elevation and partly in section.

The drawing represents the interior face of the end casting, pairs of which are opposed in spaced relationship to provide, journals for the cutter-head as 1, the supporting-roller bracket as 2, the trunnion mounting as 3 for the stationary knife, adjusting screws 4 and 5 for said stationary blade, a socket 6 into which a tie-rod, not shown, is secured to hold said pairs in spaced relationship, and the usual guard 7 for the internal gearing formed on the tractor wheels not shown.

On the reverse, or outer side of the casting, a recess indicated at 8 of circular section concentric with the socket 6, forms the journal for the tractor wheel.

The essence of the present invention resides in the particular means for lubricating the journals 1 and 8 for the cutter-head and the tractor-wheels respectively.

A cylindrical chamber 10 forms an oil reservoir to retain a substantial quantity of oil 11 of less than half the total capacity of the chamber gaged by the centrally disposed filler-plug 12 screwed into the chamber-wall 13. Ducts 14 and 15 communicate with the oil chamber 10 and the journals 1 and 8, respectively, and contain opposite ends of a suitable wick 15 the bight of which passes through the upper portion of the oil-chamber 10 out of contact with the main body of oil 11.

The important aspects of this construction lie in the provisions for manufacture as particularly related to the unique manner of operation of the device in supplying the precise quantity of oil needed for the service.

The chamber 10 is formed by a core supported upon a print extending through the aperture subsequently tapped to receive the filler-plug 12 and the ducts 14 and 15 are formed by drilling from the respective journals to the chamber, thus forming a normally oil-tight reservoir from which oil may not leak when the mower is not in use.

When the mower is in use, the accompanying vibration and reciprocatory motion of the mower common to its use, disturb the normally level surface of the oil-body 11 and the wick 15 becomes saturated with oil which is conducted to the journals by capillary action.

The oil thus supplied the wick 15 is divided between the two journals 1 and 8 in proportion to the relative speeds of the shafts served. This division proportionately is the behavior of capillary transmissions as is exemplified by the action of a fountain-pen which delivers more ink to a longer line than it does to a shorter line.

In another characteristic, capillary transmissions are capable of siphoning action in capillary structures of unequal vertical magnitudes joined at a common level. When a mower has been in use for some time an accumulation of capillary matter adheres to the surfaces contiguous the lubricated journals and shaft bearings and extending downwardly to levels below the oil supply and thus would operate to drain the oil reservoir if means are not provided to prevent this action.

When the mower is put away after use and after the wick has become saturated with oil, the siphoning action above described is broken by the recession of the main body of oil away from the wick and downwardly to its normal level as shown in the drawing. Since the interior walls of the oil reservoir are free of capillary structures, the wick and the adhering capillary matter contiguous the journals form together an integral capillary body which will retain its oil charge unless the same is forcibly removed as by the mechanical action of the shafts in the journals. Siphoning cannot occur because the oil supply is denied the wick and the totally enveloping surface tension will retain the charge.

During operation of the mower when the wick is again supplied with oil and siphoning might otherwise occur, the mechanical action of the shafts in the journals uses the complete supply gaged by the texture of the wick material.

Two objects are thus attained. First, an adequate lubrication of journals is provided; second, the supply of oil in the reservoir may not inadvertently leak away by capillary siphoning.

Having described my invention, what I claim is:

1. In lawn mowers, a wick the opposite ends of which communicate with two journals and the bight of which is disposed in an oil reservoir above the normal level of oil contained therein.

2. An end casting for lawn mowers characterized by suitable journals for the tractor wheels and the cutter-head respectively, an oil reservoir, ducts communicating with said oil reservoir and said journals respectively, a wick extending from one of said journals to the other thereof the bight of which is disposed in said oil reservoir, and a filler-plug to permit of filling said oil reservoir to some level below the bight of said wick.

3. In lawn mowers, an oil reservoir, a filler-plug disposesd below the top of said reservoir, two ducts communicating with the top of said reservoir at spaced positions, and a wick disposed in said ducts to serve two journals the bight of which wick extends between the openings of said ducts within said reservoir above said filler-plug.

4. In lawn mowers, a cylindrical reservoir disposed with its axis perpendicular to the direction of operative motion of the mower, a filler-plug disposed substantially at the center of said reservoir, two ducts communicating with the top of said reservoir at spaced positions, and a wick disposed in said ducts to serve two journals the bight of which wick extends between the openings of said ducts within said reservoir above said filler-plug.

JAMES D. BOBBROFF.